United States Patent [19]

Welburn

[11] Patent Number: 4,568,865
[45] Date of Patent: Feb. 4, 1986

[54] SELF-CORRECTED SYNCHRO/RESOLVER

[75] Inventor: Ross D. Welburn, Santa Rosa, Calif.

[73] Assignee: Motornetics Corporation, Santa Rosa, Calif.

[21] Appl. No.: 615,297

[22] Filed: May 30, 1984

Related U.S. Application Data

[63] Continuation-in-part of Ser. No. 556,083, Nov. 29, 1983, Pat. No. 4,551,708, and a continuation-in-part of Ser. No. 531,292, Sep. 12, 1983, Pat. No. 4,458,168.

[51] Int. Cl.$^4$ ............................................... G05B 1/06
[52] U.S. Cl. .................................... 318/661; 310/185; 340/347 SY
[58] Field of Search ...................... 310/49 R, 185, 184, 310/180, 254, 266, 218; 318/661; 340/347 SY

[56] References Cited

U.S. PATENT DOCUMENTS

| | | | |
|---|---|---|---|
| 3,438,026 | 4/1969 | Prill et al. | 340/347 SY |
| 3,705,343 | 12/1972 | Ringland et al. | 318/661 X |
| 4,206,374 | 6/1980 | Goddijn | 310/49 R |
| 4,223,300 | 9/1980 | Wiklund | 318/661 X |
| 4,458,168 | 7/1984 | Welburn | 310/185 |

Primary Examiner—B. Dobeck
Attorney, Agent, or Firm—Philip M. Shaw, Jr.

[57] ABSTRACT

A synchro/resolver, preferably for use in combination with a similarly constructed servo motor, having an annular stator with circumferentially arranged poles, each having a plurality of regularly pitched teeth and each pole with its own coil winding thereon, and with the coils being connected in phases, an annular, toothed rotor positioned adjacent to the stator so that a change in rotational position of the rotor changes the inductance of the coil windings as a function of the position of the rotor's teeth vis-a-vis the stators' teeth, and a detecting circuit for sensing alternating current flowing in each coil phase and for amplifying the differences between the currents in each phase to produce a rotational position output signal for commutating the motor, the stator being divided at its longitudinal midpoint into two halves which are rotated with respect to each other by a distance equal to one tooth pitch divided by the number of phases and being separated from each other by a lamina of non-magnetic material.

13 Claims, 9 Drawing Figures

CONVERTING INDUCTANCE SYNCHRO
SIGNALS TO STANDARD SYNCHRO FORMAT

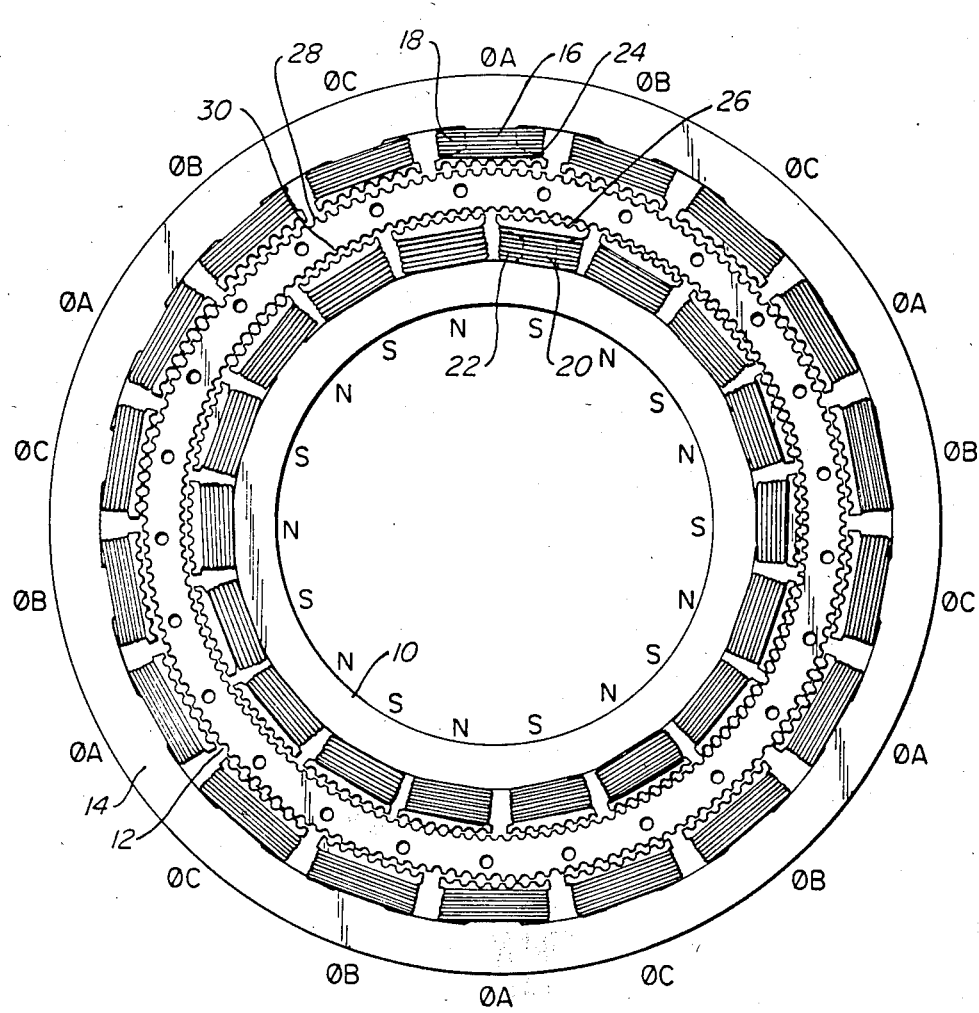
FIG._1.

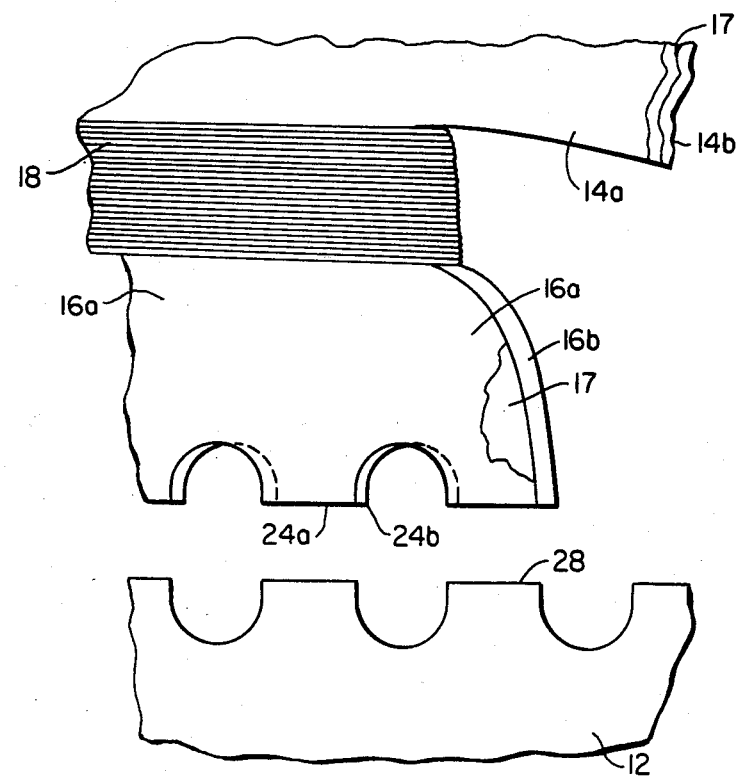
FIG._2.
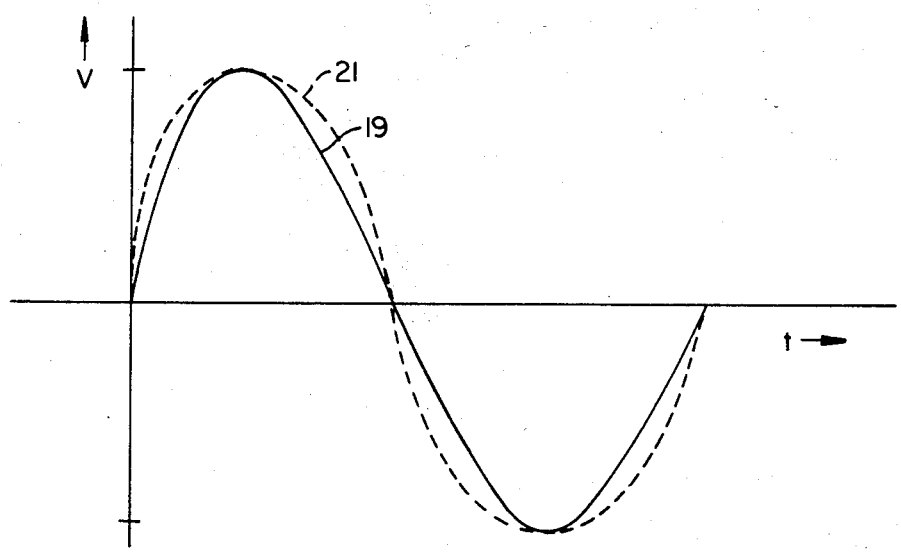
FIG._3A.

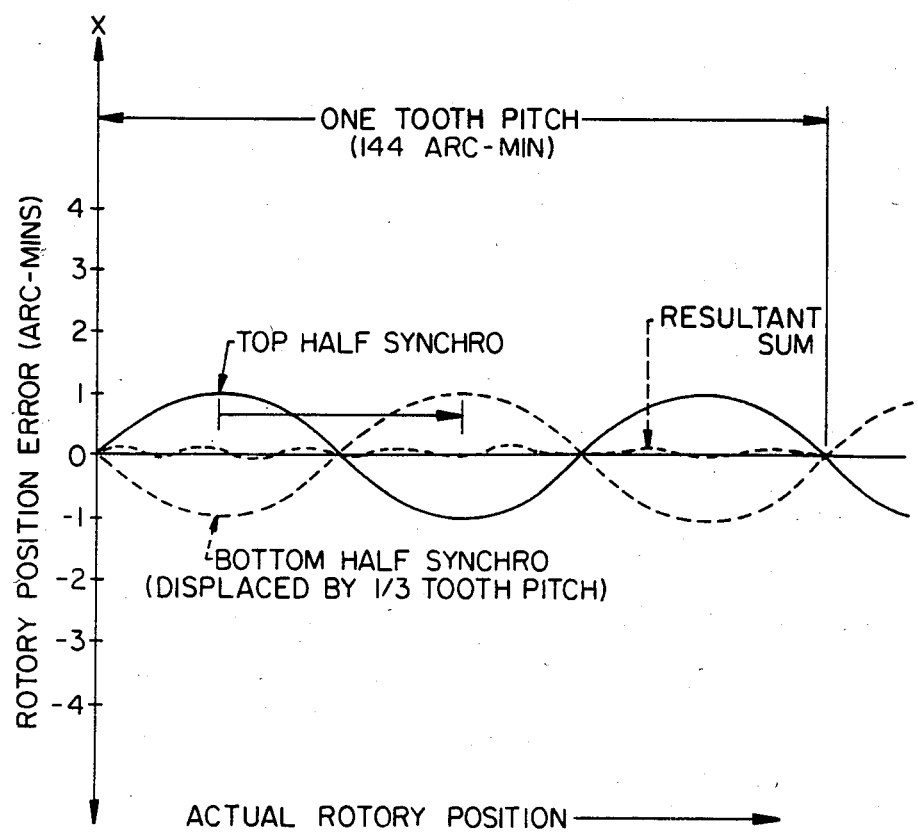
ERROR COMPENSATION DIAGRAM
(BY SUMMING IN PHASE ERROR
WITH OUT-OF-PHASE ERROR)
FIG._3B.

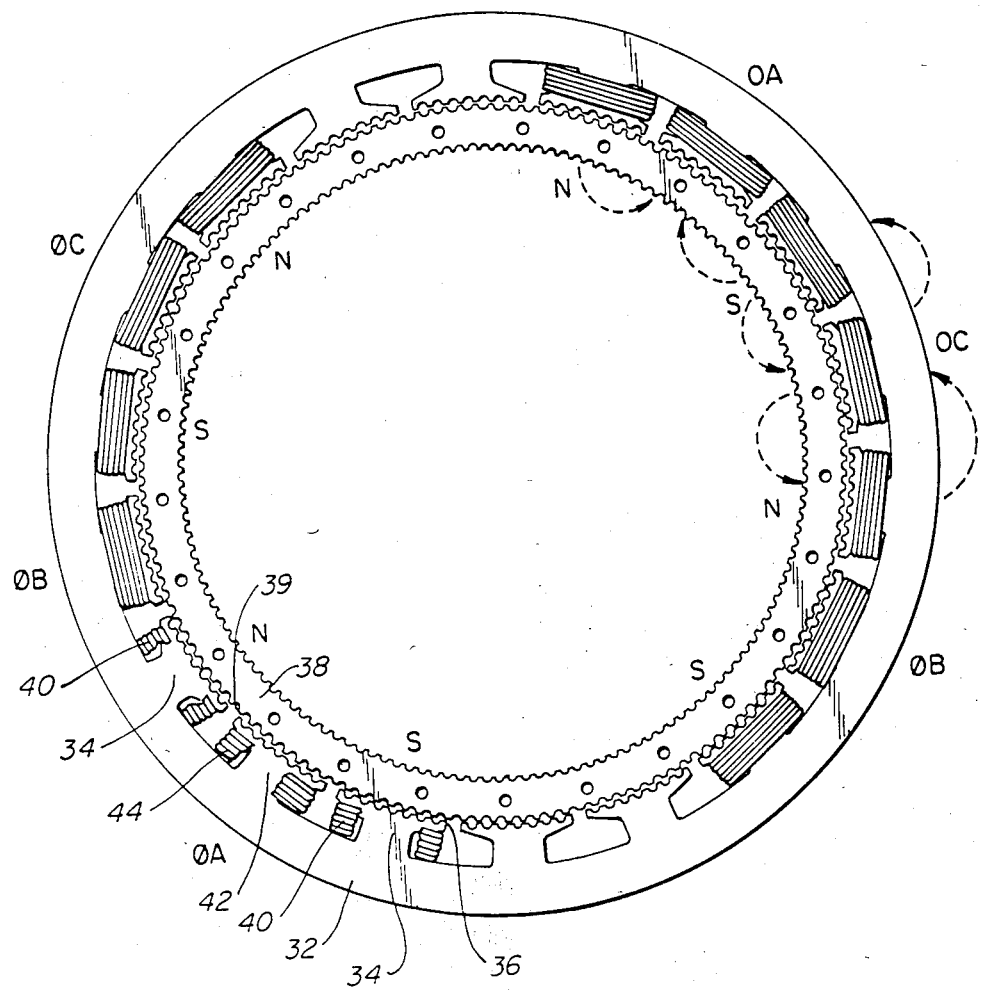
FIG._4.

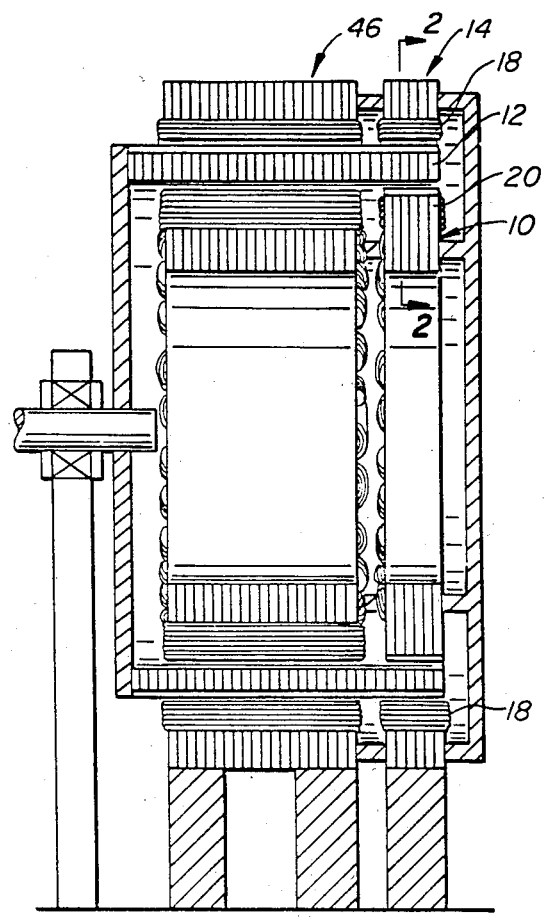
FIG._5.

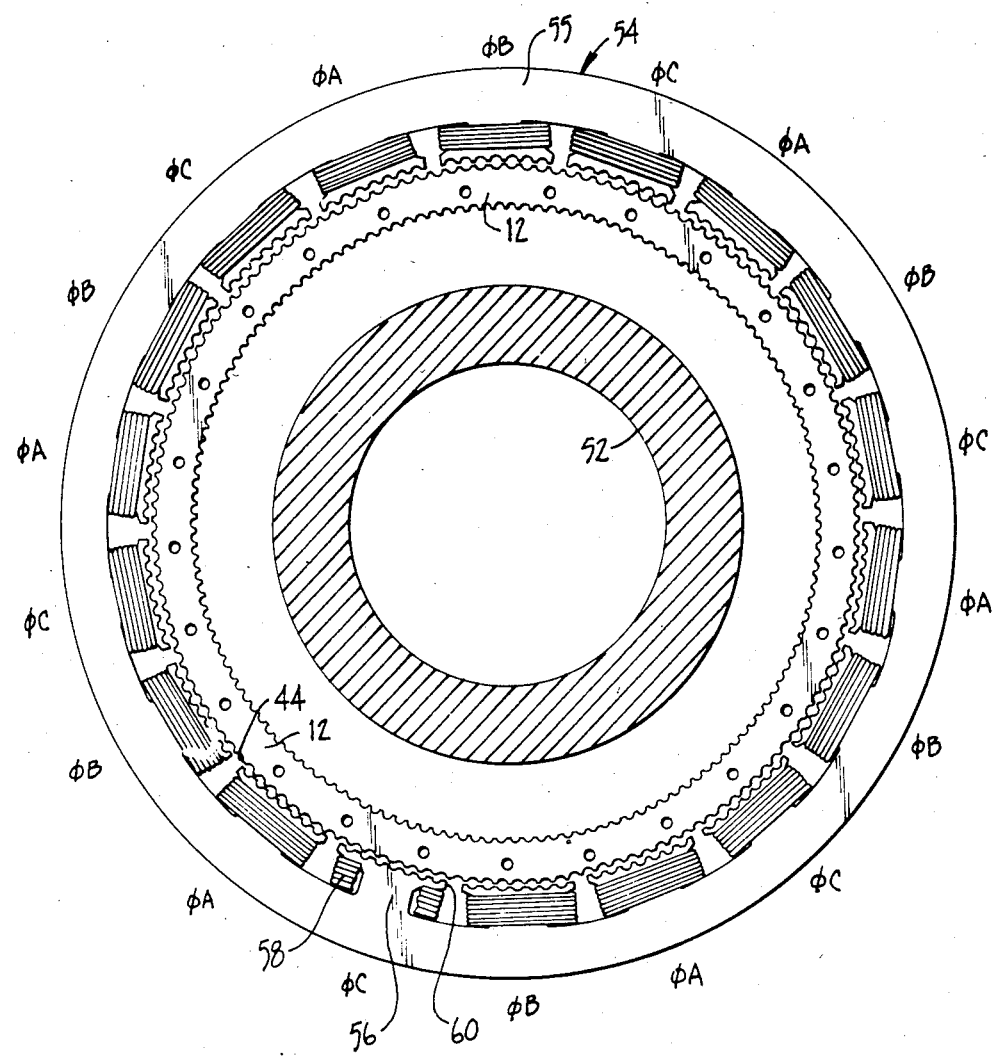
FIG._6.

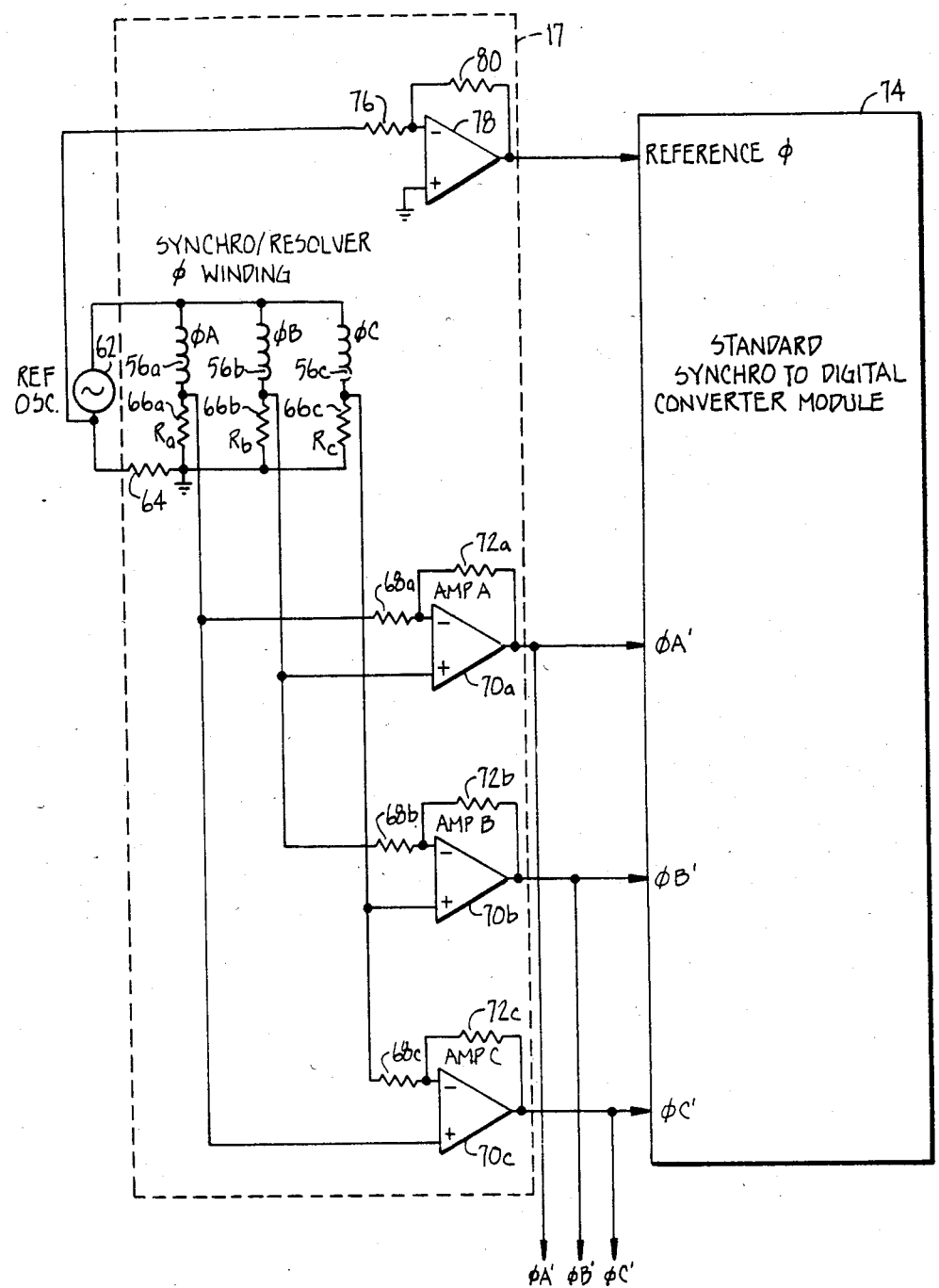
CONVERTING INDUCTANCE SYNCHRO
SIGNALS TO STANDARD SYNCHRO FORMAT
FIG._7.

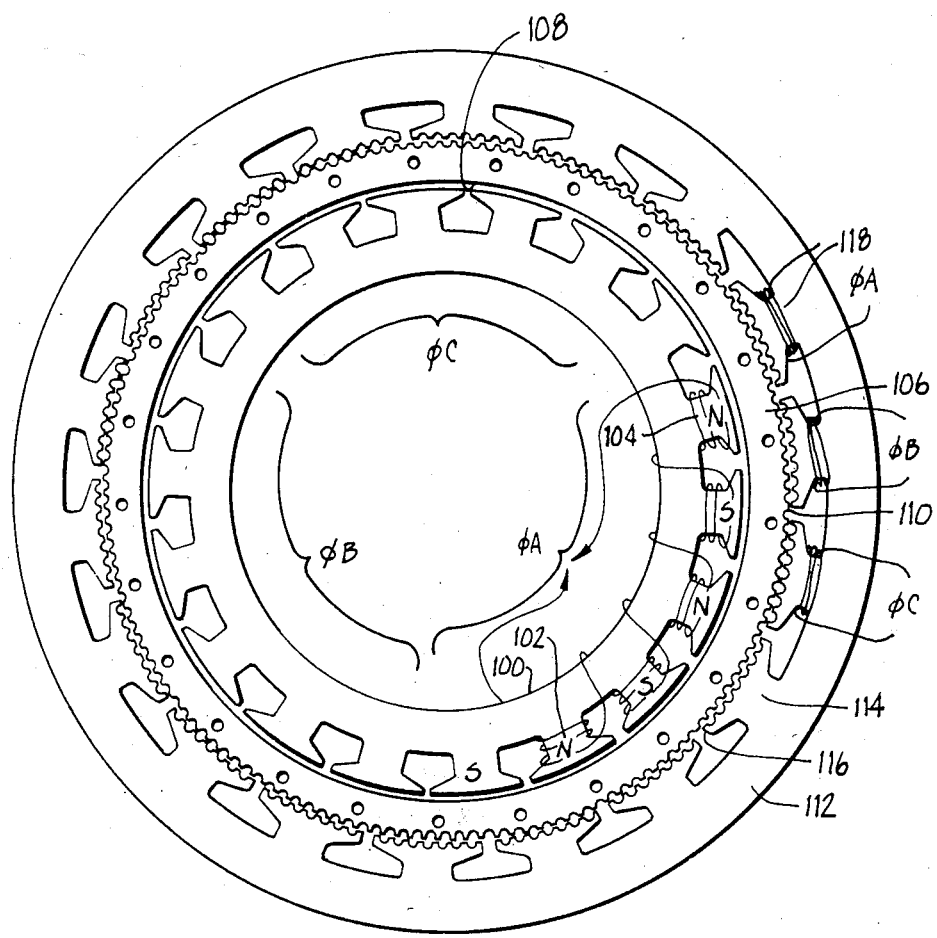
FIG._8.

SELF-CORRECTED SYNCHRO/RESOLVER

CROSS REFERENCE TO RELATED APPLICATION

This application is a continuation-in-part of my co-pending applications Ser. No. 556,083 entitled Reluctance Commutated High Resolution Servo Motor System, filed Nov. 29, 1983 now U.S. Pat. No. 4,551,708, and Ser. No. 531,292, filed Sept. 12, 1983 now U.S. Pat. No. 4,458,168, entitled Toothed Reluctance Synchro/Resolver.

DESCRIPTION

1. Technical Field

This invention relates to a high resolution synchro/resolver and more particularly to a self-corrected synchro/resolver for use with a toothed reluctance motor. It can also be used as an independent positioning device.

2. Background Art

In the applicant's above-mentioned prior U.S. patent applications, a synchro/resolver was constructed out of components which were substantially identical to the corresponding components to the motor to which the synchro/resolver is connected. These components, however, were designed to operate in full magnetic saturation which is the normal operating mode for them when they are being used in the motor environment. In the synchro/resolver, however, they are only lightly magnetically saturated and this can produce distortions in the output waveform from the synchro/resolver.

As is well-known, synchro/resolvers are supplied with a moderately high-frequency alternating current which is then modulated by the rotation of the rotor of the synchro/resolver with respect to the stator. The modulation waveform of the alternating current is then used to determine the position of the synchro/resolver rotor relative to the stator. If the resolver is being rotated at a constant speed, this output envelope waveform should be substantially sinusoidal. In the applicant's prior synchro/resolvers, this is not the case, however. The output waveform envelope has more of a parabolic waveform than a sinusoidal waveform, and this has proved undesirable in some applications.

DISCLOSURE OF INVENTION

The above problems of the prior synchro/resolvers are overcome by the present invention of a transducing apparatus which comprises a stator assembly having a plurality of stator poles, a separate winding for each pole and with certain of the windings being electrically connected in different phases. In the preferred embodiment of the invention, the stator is comprised of annularly shaped laminae and the stator poles have a plurality of radially projecting teeth. To eliminate the distortion referred to above, the stator assembly is divided in half at the point midway along its longitudinal axis. Half of the stator laminae are separated from the remaining half by a lamina of non-magnetic material. The first half of the stator is rotated with respect to the second half by an angle corresponding to the angular pitch of one stator tooth divided by the number of phases of the synchro/resolver windings.

The synchro/resolver further includes a rotor which is positioned adjacent to the stator poles for changing the inductance of the stator pole windings as a function of the rotational position of the rotor relative to the stator poles.

The rotor and the stator are connected to a motor such that a change in the rotational position of the output shaft of the motor produces a corresponding change in the relative rotational position of the synchro/resolver's rotor. Means are further provided for detecting the change in inductance of each stator coil winding phase relative to each of the other coil winding phases to determine the rotational position of the rotor means, and hence of the output shaft. this means then produces an output signal which is representative of the rotational position of the output shaft of the motor.

In one embodiment, the detecting means of the synchro/resolver comprises a source of alternating current which is connected to each of the stator coil windings, differential amplifier means for detecting the alternating current flowing through each phase of the coils and for amplifying the differences between the currents in each coil phase, and means for comparing the phase of each of the different currents with the phase of the alternating current source to produce the output signal which is representative of the rotational position of the rotor, and hence of the output shaft.

In another embodiment, the stator coils comprise a plurality of primary windings, each being wound on a separate stator pole piece in such a fashion as to induce alternately polarized magnetic fields in each successive pole piece on which a primary winding is wound, and a plurality of secondary windings, each being wound on a separate stator pole piece intermediate the stator pole pieces on which the primary windings are wound. These secondary windings act as sensing coils for the synchro/resolver. A winding is not required for every pole because the magnetic field in each pole is multiplied by the interaction of the rotor and stator teeth. With this design it is possible to have a much higher resolution resolver without the cost of adding more windings. The resolver of the present invention also has the advantages of no brushes or slip rings. A conventional synchro/resolver of this resolution would require 300 pole windings for each of the three phases for a total of 900 pole windings which is totally impractical for a 6 inch diameter synchro/resolver.

In one variation of other embodiment of the invention, the stator assembly is comprised of a first set and a second set of pole pieces, each in an annular configuration with an annular rotor concentrically interposed between the first and second stator assembly sets. Thus, the stator assembly and the rotors are all aligned coaxially and with the primary windings being wound on the inner stator assembly and the secondary windings being wound on the outer stator assembly. The angular orientation of the outer stator poles is such as to fall between the inner stator poles. In another variation of this embodiment of the invention, only a single outer stator assembly is utilized in conjunction with the rotor. In this arrangement, every other stator pole piece has a primary winding and every other stator pole piece has a secondary winding.

In all embodiments, the corresponding components of the synchro/resolver are otherwise constructed substantially identical to the corresponding motor components. Because of this fact and because the synchro/resolver output is used for commutation, a true proportional comutation will result, irrespective of changes in the motor design from model to model. Furthermore, the synchro/resolver of the present invention is highly accurate.

It is therefore an object of the present invention to provide a synchro/resolver which is relatively immune to distortion.

It is a further object of the invention to have an accurate, high resolution, multiple synchro/resolver that is simple and that requires minimal maintenance.

It is yet a further object of the invention to provide a synchro/resolver having the same laminae as are used in the motor to which the synchro/resolver is connected.

It is still another object of the invention to provide a synchro/resolver having no brushes or slip rings.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a plan diagram showing a lamina and winding coil structure of a first embodiment of the invention;

FIG. 2 is an enlarged, vertical, section view, with portions broken away, taken generally along the lines 2—2 in FIG. 5;

FIGS. 3A and 3B are waveform diagrams for use in explaining the effect of the stator construction shown in FIG. 2;

FIG. 4 is a plan diagram showing a lamina and winding coil arrangement of a second embodiment of the invention;

FIG. 5 is a vertical, sectional view of the synchro/resolver of the invention when coupled to a motor of similar construction;

FIG. 6 is a plan diagram showing a lamina and winding coil arrangement of a third embodiment of the invention;

FIG. 7 is a schematic diagram of a synchro/resolver detecting circuit for use with the embodiment depicted in FIGS. 6 and 8; and FIG. 8 is a plan diagram showing a lamina and winding coil arrangement of a fourth embodiment of the invention.

BEST MODE FOR CARRYING OUT THE INVENTION

The reference numerals used throughout this specification correspond to those used in the applicant's above-identified co-pending applications. Referring now more particularly to FIG. 1, the plan views of the stator and rotor laminae which make up the synchro/resolver of the invention are illustrated. It will be appreciated that the structure of this synchro/resolver is the same in concept as that used in the synchronous motor disclosed in the applicant's copending application Ser. No. 385,034, filed June 4, 1982 and entitled "High Torque Robot Motor." Basically the resolver is made up of a stack of annular shaped inner stator laminae 10 which are coaxially surrounded by a stack of annular rotor laminae 12, which, in turn, are coaxially surrounded by a stack of annular, outer stator laminae 14. The rotor 12 is rotatably mounted between the inner stack 10 and the outer stack 14 as is described more fully in the applicant's above-identified co-pending application and as illustrated in FIG. 3. The outer stack 14 is comprised of a plurality of circumferentially arranged stator pole pieces 16, each of which is surrounded by a separate coil 18. The inner stator stack 10 has a plurality of circumferentially arranged stator pole pieces 20 each of which is surrounded by a separate coil 22. The coils 22 are alternately wound in different directions so that when current is applied to these coils 22 successive magnetic fields having opposite polarities will be generated around the circumference of the inner stator stack 10.

It will be noted that each stator pole 16 is aligned along radial lines passing between the stator poles 20 and that each pole 16 is provided with a plurality of teeth 24. Each pole piece 20 is provided with a plurality of pole piece teeth 26, and the outer and inner circumferences of the rotor 12 are each provided with separate corresponding sets of teeth 28 and 30, respectively. The spacing between the teeth 30 matches the spacing between the teeth 26 and the spacing between the teeth 28 matches the spacing between the teeth 24. The arrangement between stator poles 16 is such that the spacing between the teeth 24 on one stator pole 16 are an integral number of teeth plus one third of a tooth pitch from the teeth 24 of the next adjacent stator pole.

The coils 18 are secondary windings. They are connected to amplification and detection circuitry (not shown) which detects the magnitude and phase of the voltage appearing at the secondary winding to determine the position of the rotor.

In operation, because the current through the coils 22 is alternating, the flux will also alternate. This alternating current flux is coupled from the inside stator pole pieces 20, through the rotor 12 to the appropriate outside stator teeth 24. The outside stator pole 16 which has the most stator teeth engaged in common with the inside stator teeth 26 through the rotor 12 will receive the most flux. The maximum signal, therefore, on that particular phase of the secondary coils 18 will have the maximum signal. The secondary coils 18 are connected in three phases, denoted A, B and C. Only one phase winding at a time receives the maximum signal magnitude.

One important point is that the secondary windings 18 on the outside stator 14 pick up the signal differentially from the two corresponding inside primary windings 22. When phase A is completely lined up, that is, the teeth 28 of the rotor 12 are completely aligned with the teeth 24 of the stator pole pieces 16 corresponding to phase A, then the signal derived at the coil 18 of phase A will be zero because each of the two adjacent primary windings 22 will cancel each other out. When the teeth on the secondary winding 18 for phase A are totally misaligned, the output signal is also at null or zero. The signal picked up by the secondary winding 18 for any of the phases will only have any significant magnitude when one of the adjacent primary windings 22 is coupled through the rotor 12 to the secondary winding 18 more than the next adjacent primary winding 22 of the opposite polarity. This differential action minimizes the effect of the variable air gap since the gap affects both differential primaries equally. The alignment between the inside stator 10 and the outside stator 14 is important but any local position errors are integrated out since many teeth, therefore many windings (in the case illustrated in FIG. 1, six windings), are averaging the signal. The primary of the synchro may be on the inside stator or the outside stator with equivalent results.

Referring now more particularly to FIGS. 2 and 3A and 3B, as previously mentioned the components of the synchro/resolver are made substantially identical to the corresponding components of the motor which will be used to drive the synchro/resolver. This is especially useful, as will be explained further in this application, when the synchro/resolver is used for commutating the motor. The stator tooth profile of the synchro/resolver will produce a signal current which automatically matches the requirements of the motor for waveform shape, duration and phase. However, because the stator tooth will appear magnetically "fatter" when it is fully saturated, as it is when in the motor, than when it is lightly saturated, as it is in the synchro/resolver, the output envelope from the synchro/resolver will not be fully sinusoidal even though the resolver is being driven at a constant speed of rotation. Certain other distortions are also introduced because the stator and rotor teeth are not specifically designed to operate in a synchro/resolver mode but, instead, are designed for use in the torque motor.

In order to compensate for this fact, in all of the synchro/resolver embodiments discussed herein, the laminated stator 14 is divided into two halves at a point midway along its longitudinal axis. The two halves, which are designated 14a and 14b, are separated by a lamina of non-magnetic material 17. The stator half 14b is then rotated with respect to the stator half 14a by an angular distance which is equal to the number of phases of the synchro/resolver stator coils, in this case three, divided into the angular pitch of the stator teeth 24.

The output voltage from this synchro is an AC signal whose amplitude is modulated based on rotor position. FIG. 3A shows the detected output which is not able to be sampled except inside a resolver to digital converter, such as unit 74 which in FIG. 7. The waveform 19 depicts the envelope of the signal prior to the shift between the stator halves 14a and 14b. This angular shift, however, has the effect of producing a second waveform which is slightly shifted in time with respect to the waveform 19. The net result is depicted by the dotted waveform 21 which approaches a more conventional sinusoidal shape. What has been done is to make the stator teeth 24 appear magnetically fatter in light saturation than they would otherwise be.

Referring to FIG. 3B, the shifted half of the lamination stack produces a position error that is 180° out of phase with the unshifted lamination half thereby cancelling the periodic component of the position error. Simply shifting or "skewing" the teeth without a spacer does not achieve the true sum required on cancellation because they must operate independently of each other. If one half of the stack is shifted without a spacer, then the magnetic flux from both will jump the space between the two sets, producing undesirable interaction and no "out of phase" position error will be available for cancellation. Note, for a three phase motor, the rotor laminations may be shifted ⅓ of a tooth pitch instead, as long as the space between the stator halves remains intact. Each half must operate independently from the other with no flux between the two.

Referring now more particularly to FIG. 4, an alternative embodiment of the invention is illustrated which employs basically the same concept as the embodiment depicted in FIG. 1 except that only one stator is required, in this case the outside stator only, although it would work equally well with only an inside stator. The use of an outside stator is done for simplicity since it is more difficult and expensive to support an inside stator. Thus an outside stator is made up of a stack of laminae 32 each having a plurality of primary stator poles 34 arranged around the inner circumferential edge of the ring 32.

On each of the stator poles 34, a primary coil winding 40 is wound. The coil windings on alternate stator poles 34 are wound in the opposite direction so that when the coils are energized, magnetic fields having alternating north and south magnetic polarities will be generated at the successive pole pieces 34. Each pole piece 34 is provided with a plurality of pole piece teeth 36 extending toward the radial center of the ring 32. The rotor 38 has a plurality of radially outwardly extending teeth 39 which are juxtaposed to the teeth 36.

Between each pole piece 34 is a stator pole piece 42 extending radially inwardly from the ring 32. A coil 44 is wound on each pole piece 42 and the coils 44 are connected in three phases, denotes A, B or C as indicated. In operation, the coils 40, wound on each pole piece 34, act as primary windings and the coils 44 wound on pole pieces 42 act as secondary windings. Thus, every other outside stator winding 40 is a primary winding and every other outside stator winding 44 is a secondary winding. The dotted lines and arrows in FIG. 2 show the lines of magnetic flux for the A and C phases. It can be seen, for example, that phase C is at a null position because the C winding 44 is picking up signals of equal magnitude from the windings 40 on either side and the magnetic flux generated by each of these windings 40 is cancelling the magnetic flux of the other at the secondary winding 44. As in the embodiment depicted in FIG. 1, this synchro/resolver is a differential device and the magnetic coupling difference is impressed upon the secondary windings 44.

One difference between the embodiment of FIG. 1 and the embodiment of FIG. 4 is that in the embodiment of FIG. 1, the primaries are one third of a tooth pitch non-aligned, with the secondaries between them, whereas in the embodiment of FIG. 4, the primary windings are two thirds of a tooth pitch non-aligned with the secondary between them. This difference does not affect the operation of the synchro/resolver because of the differential pick-up operation. The resolver depicted in FIG. 4 is, however, not as accurate because not as many secondary windings can be used to average out mechanical errors. This is evident because in the embodiment of FIG. 1 there are six windings per phase whereas there are only two windings per phase in the embodiment of FIG. 4. Also, in the embodiment of FIG. 4 the resolver wastes two sets of poles because they are not evenly divisible by three. Twenty four poles would be a better number for the embodiment of FIG. 4. A common disadvantage to both types of resolvers is that the output signal is lower than for a conventional resolver and must be amplified to be compatible with conventional resolving circuitry.

Referring now to FIG. 5, as mentioned above, the synchro/resolver of the invention is conveniently made from the same laminae used for assembling the motor 46 to which the synchro/resolver is attached. This allows the rotor 12 of the resolver, for example, to be integrally assembled as part of the rotor of the motor. Also the stator assemblies 10 and 14 can be easily mounted on the corresponding stator assemblies of the motor.

Referring now more particularly to FIG. 6, in still another embodiment, the synchro/resolver 16 is comprised of a plurality of annular shaped laminations 55 each having a plurality of regularly, circumferentially spaced, and radially inwardly projecting stator poles 56. Each stator pole 56 has a separate coil 58 wound thereon and is provided with radially projecting teeth 60. The construction of the synchro/resolver stator 54 is substantially identical to the outer stator of the motor (not shown). The coils 58 are connected in phases A, B and C to correspond to the phases of the coils of the motor. The motor rotor 12 extends beyond the motor stators and is positioned coaxially interiorly of the outer stator 54 of the synchro/resolver so that the rotor teeth 44 oppose the synchro/resolver stator pole piece teeth 60.

As will be described in greater detail in reference to FIG. 7, the synchro/resolver, instead of producing torque with a change of magnetic reluctance, as is the case in the motor, is supplied with an alternating current in the windings 58 and the change in inductive reactance as the rotor 12 rotates is monitored by the detector circuit 17. When the magnetic teeth 60 and 44 are aligned, the inductance in the energized stator pole piece winding 58 is higher than when the teeth are misaligned. This variation in inductance can be detected by the variation of the alternating load when driven from a constant alternating current voltage source. This alternating current develops a voltage drop across a current sensing resistor which is in series with each phase. This will now be explained in greater detail.

Referring now more particularly to FIG. 7, the detector circuit 17 comprises a source of alternating current, i.e. an oscillator 62, and is connected at one of its output terminals through resistor 64 to the circuit ground. Each of the windings of a given phase, such as for example all of the windings 56 of phase A, which are designated in the FIG. 7 as 56a, are connected through a current sensing resistor 66a to the circuit ground. Likewise, the one side of the windings 56b of phase B and the windings 56c of phase C are connected through separate current sensing resistors 66b and 66c to the circuit ground. The other ends of the windings 56a, 56b and 56c are connected to the ungrounded terminal of the oscillator 62.

The voltage developed across the current sensing resistor 66a is supplied to the non-inverting input terminal of a differential amplifier 70c and, through an input resistance 68a, to the inverting input terminal of a differential amplifier 70a. The voltage developed across the current sensing resistor 66b is supplied to the non-inverting input terminal of the diferential amplifier 70a and, through an input resistance 68b, to the inverting input terminal of a differential amplifier 70b. Correspondingly, the voltage developed across the current sensing resistor 66c is supplied to the non-inverting input terminal of the amplifier 70b and, through an input resistor 68c, to the inverting input terminal of amplifier 70c. Each of the amplifiers 70a, 70b, and 70c has a separate feedback resistance 72a, 72b and 72c, respectively. The outputs of the amplifiers 70a, 70b and 70c are supplied as separate phase inputs to a synchro-to-digital converter module 74. Such devices are wellknown in the art and are commercially available. One such device is a Model XDC19109-301 available from ILC Data Device Corporation, 105 Wilbur Place, Bohemia, N.Y. 11716. This device produces a digital synchro position signal as its output.

The digital converter module 74 must also have a reference signal. This is provided by supplying the voltage developed across the resistor 64 through an input resistance 76 to the inverting input terminal of a differential amplifier 78 whose non-inverting input terminal is connected to the circuit ground. A feedback resistance 80 is connected between the output terminal and the inverting input terminal of the amplifier 78. The output terminal of the amplifier 78 is connected to the reference signal input of the digital converter module 74.

The operation of the reactance detection circuit 17 is as follows. Because of leakage inductance in the windings 56a, 56b and 56c, the output signal across the current sensing resistors 66a, 66b and 66c is only modulated about 30 to 40% and must be differentially amplified by amplifiers 72a, 72b and 72c. The difference between the voltages developed across resistors 66a and 66b then becomes the signal, as the leakage inductance reactance common to both phases is now cancelled. Each of the three phases is treated this way by comparing one phase with the next until all three phases are corrected to supply the phase A', phase B' and phase C' outputs. The reference phase is supplied as the output of the amplifier 78 in the form of a current signal to cancel the 90° phase error produced by the current sensing resistors 66a, 66b and 66c of each phase. The phase A', phase B' and phase C' outputs and the reference signal now look like the standard synchro/resolver output and are compatible with a common synchro/resolver-to-digital converter 74.

The arrangement depicted in FIG. 7 will work with an outside stator only, as illustrated in FIG. 5, an inside stator only, or, for a larger signal and more positional accuracy, with both an inside and an outside stator. Furthermore, the concept applies equally to a two phased resolver, a three phase synchro or a positional transducer with any number of phases.

Referring now more particularly to FIG. 8, still another alternative embodiment of the synchro/resolver according to the invention is illustrated. In this embodiment, the resolver has a cylindrical inner stator 100 having a plurality of radially projecting stator pole pieces 102 spaced apart by equal distances about the circumference of the inner stator assembly 100. Each pole piece 102 does not have teeth, however, unlike the stator poles 56 of the other embodiments. A separate coil 104 is wrapped around each stator pole 102. The coils of a number of circumferentially adjacent poles 102 are connected together in a single phase. For an 18 pole, 3-phase motor, the coils of six poles would be connected together. The coils are wound or connected so that when energized, they produce a magnetic flux in the poles which alternates in polarity from one pole to the next.

Coaxially surrounding the inner stator 100 is the rotor 106 which is cylindrically shaped, similar to the rotor 12 of the motor. About the outer periphery of the motor 106 are a plurality of radially projecting teeth 110. Around the interior surface of the rotor 106, however, there are no teeth. Instead, the internal diameter of the rotor 108 is slightly eccentric. Thus, the air gap which extends between the internal diameter of the rotor 106 and the outer surface of the poles pieces 102 varies in the circumferential direction. More particularly, this air space will vary in distance with respect to any particular pole piece 102 as the rotor 106 is rotated.

Coaxially surrounding the rotor 106 is the outer stator assembly 112 which is also cylindrically shaped and has inwardly, radially projecting pole pieces 114, each of which is equipped with radially projecting pole piece teeth 116 which oppose the teeth 110. Each pole piece 114 has a coil 118 wrapped around it. The coils 118 are connected in phases in the same fashion as the coils 58 in the embodiment of FIG. 6.

In operation, the change in inductance in the outer coils 114 is sensed by the same type of circuit as depicted in FIG. 7. The information thus derived will tell the servo control circuit that the position of the rotor within 1/150th of a revolution.

At the same time, each rotation of the rotor 106 will cause one sinusoidal waveform to be generated for each phase A, B and C which waveform will indicate the gross position of the rotor within the entire revolution. The coils 104 are also connected to the same type of detector circuit as depicted in FIG. 8 and the outputs of the detector circuits for both the outer coils and the inner coils are supplied to separate resolver/detectors 74. The digital output of the two resolver/detectors are then supplied to the servo control circuit 14 with the output of the resolver/detector connected to the coils 104 forming the most significant digital bits and the resolver/detector connected to the coils 118 supplying the least significant bits to the servo control circuit 14. This allows absolute positioning detection of the output shaft of the motor which is connected to the rotor 106.

In prior art resolvers, such as those using an optical encoder, it is necessary to provide a reference point by first energizing one phase of the motor in order to align the teeth or poles. Thereafter, when the motor is rotated, the optical encoder supplies a stream of digital pulses representative of how far the motor has revolved from that reference point. Even this approach sometimes fails if the motor is heavily loaded and does not originally achieve its preset starting point. The present invention, however, as depicted in FIG. 6, allows an absolute position over one commutation pitch, and always in the correct phase.

Because of the high resolution of the synchro/resolver according to the invention, velocity information can be obtained even at low speeds.

Further advantages are obtained in using the same design of laminations for the motor and the synchro/resolver and then using the output of the synchro/resolver for proportional commutation. The stator tooth profile of the synchro/resolver will produce a signal current which automatically matches the requirements of the motor for waveform shape, duration and phase. Thus, if the tooth width of the motor is modified or the gap between the rotor or the stator is modified in designing the motor, the synchro/resolver, which is made of identical components, will also be correspondingly modified to produce a commutation signal which operates the motor windings correctly under the new set of design conditions. It is as though the teeth of the motor were commutating themselves as opposed to more mechanical commutation devices such as optical encoders that have no magnetic bearing on the motor requirements.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. A position sensing device of the type having an annular stator having a plurality of pole pieces each of which has a plurality of regularly pitched teeth, a plurality of coil windings, each wound on a separate stator pole piece and with the windings being electrically connected in phases, toothed rotor means positioned adjacent the stator poles for changing the inductance of the stator pole windings as a function of the rotational position of the rotor teeth relative to the stator teeth, and
means for detecting the change in inductance of each coil winding phase relative to each of the other coil winding phases to determine the rotational position of the rotor means and to produce an output signal representative thereof, characterized in that the stator is divided at its longitudinal midpoint into two halves which are rotated about the stator's longitudinal axis relative to each other by an amount equal to one stator tooth pitch divided by the number of winding phases and further comprising a lamina of non-magnetic material separating the two stator halves.

2. A position sensing device as recited in claim 1 wherein the detecting means comprises a source of alternating current connected to each of the stator coil windings, differential amplifier means for detecting the alternating current flowing through each phase of the coils and for amplifying the differences between the currents in each coil phase, and means for comparing the phase of each of the current differences with the phase of the alternating current source to produce the output signal which is representative of the rotational position of the rotor means.

3. A position sensing device as recited in claim 1 wherein the rotor means is a rotatably mounted ring having a plurality of regularly spaced teeth about its circumference in correspondence with the stator pole piece teeth, and wherein the stator poles are spaced apart by a distance which is a non-integral multiple of the pitch of the stator teeth.

4. A position sensing device as recited in claim 3 wherein the rotor and the stator of the device are connected, respectively, to a rotor and a stator of a motor of like construction.

5. Synchro/resolver apparatus comprising
a stator assembly having a succession of pole pieces, each pole piece having a plurality of spaced apart pole piece teeth,
a rotor having a plurality of pole piece teeth corresponding to the stator teeth and positioned juxtaposed to the stator poles,
a plurality of primary windings electrically connected in phases each primary winding being wound on a separate stator pole piece in such a fashion as to induce alternately polarized magnetic fields in each successive pole piece on which a primary winding is wound, and
a plurality of secondary windings, each being wound on a separate stator pole piece intermediate the stator pole pieces on which the primary windings are wound,
the stator being divided at its longitudinal midpoint into two halves which are rotated about the stator's longitudinal axis relative to each other by an amount equal to one stator tooth pitch divided by the number of winding phases, and
a lamina of non-magnetic material separating the two stator halves.

6. Synchro/resolver apparatus as recited in claim 5 wherein the stator assembly is comprised of a first set and a second set of pole pieces, each on an opposite side of the rotor, each stator assembly being divided into halves at its longitudinal midpoint which are rotated with respect to each other by a distance equal to one stator tooth pitch divided by the number of winding phases, a lamina of non-magnetic material separating the stator halves, the rotor having two sets of corresponding teeth, each set being juxtaposed to a separate one of the sets of stator pole piece teeth and wherein the primary windings are wound on the first set of stator pole pieces and the secondary windings are wound on the second set of stator pole pieces.

7. Synchro/resolver apparatus as recited in claim 5 wherein the stator assembly and the rotor are ring shaped.

8. Synchro/resolver apparatus as recited in claim 5 wherein the apparatus is integrally constructed with an electric motor having a laminated rotor and a laminated stator and further wherein the stator assembly and the rotor of the transducer apparatus are comprised of laminations having the same form as the laminations of the motor's stator and rotor.

9. Synchro/resolver apparatus as recited in claim 5 wherein the stator assembly is comprised of a single set of pole pieces arranged in a ring, the rotor is ring shaped and is concentric with respect to the stator assembly and has a plurality of teeth juxtaposed to the stator teeth, and wherein the primary windings are wound on alternate pole pieces and the secondary windings are wound on the in-between pole pieces.

10. A position sensing device comprising
a first stator having a plurality of pole pieces,
a plurality of first coil windings, each pole piece of the first stator having a single one of the first coil windings wound on it, and with the first coil windings being connected together in a plurality of phases, wherein the stator is divided at its longitudinal midpoint into two halves which are rotated about the stator's longitudinal axis relative to each other by an amount equal to one stator tooth pitch divided by the number of winding phases,
a lamina of non-magnetic material separating the two stator halves,
rotor means positioned adjacent the first stator's poles, and movable with respect to them, for changing the inductance of the first coil windings as a function of the position of the rotor means relative to the first stator's poles,
oscillator means for supplying an alternating current reference signal to the first coil windings,
first current sensing means for detecting the magnitude of the alternating currents flowing through each phase of the first coil windings,
first differential means connected to the first current sensing means for determining the differences in the magnitude of such alternating currents between each phase and for amplifying such differences, and
first comparing means for comparing the phase of each of the current magnitude differences with the phase of the alternating current reference signal to produce a first output signal which is representative of the position of the rotor means relative to the first stator.

11. A position sensing device as recited in claim 10 further comprising
a second stator having a plurality of pole pieces,
a plurality of second coil windings connected to the oscillator means, each pole piece of the second stator having a single one of the second coil windings wound on it, and wherein the second coil windings on groups of adjacent second stator pole pieces are connected together in phases and the phases of the first coil windings are wound on non-adjacent first stator pole pieces,
the second stator being positioned relative to the rotor such that relative movement between the rotor and the second stator causes a corresponding change in the inductance of the second coil windings,
second current sensing means for detecting the magnitude of the alternating currents flowing through each phase of the second coil windings,
second differential means connected to the second current sensing means for determining the differences in the magnitudes of such alternating currents between each phase of the second coil windings and for amplifying such differences,
second comparing means for comparing the phase of each of the current magnitude differences with the phase of the alternating current reference signal to produce a second output signal which is representative of the gross position of the rotor relative to the second stator.

12. A position sensing device as recited in claim 11 wherein the first stator's pole pieces each have a plurality of pole piece teeth and the rotor means has a plurality of teeth spaced at same pitch in correspondence with the first stator's pole piece teeth and opposing them, and wherein the first stator's pole pieces are spaced apart by a distance which is a non-integral multiple of the pitch of the first stator's pole piece teeth, and wherein the second stator's pole pieces and the portion of the rotor opposing them are smooth, the rotor having a protruding portion opposed to the second stator pole pieces, the protruding portion extending over a length corresponding to a distance which is less than the distance occupied by the second stator's pole pieces of any given phase, whereby the first output signal indicates the discrete position oif the rotor relative to the first stator's pole pieces within any given phase and the second output signal indicates the gross position of the rotor relative to the second stator's pole pieces phases.

13. A position sensing device as recited in claim 10 wherein the first stator's pole pieces each have a plurality of pole piece teeth and the rotor means has a plurality of teeth spaced at the same pitch in correspondence with the first stator's pole piece teeth, and wherein the first stator's poles are spaced apart by a distance which is a non-integral multiple of the pitch of the first stator's teeth.

* * * * *